US010512010B2

(12) United States Patent
Agiwal et al.

(10) Patent No.: US 10,512,010 B2
(45) Date of Patent: Dec. 17, 2019

(54) METHOD AND APPARATUS FOR CHANGING BASE STATION IN WIRELESS COMMUNICATION SYSTEM

(71) Applicant: Samsung Electronics Co., Ltd, Suwon-si (KR)

(72) Inventors: Anil Agiwal, Suwon-si (KR); June Hwang, Incheon (KR); Hyun-Jeong Kang, Seoul (KR); Young-Bin Chang, Anyang-si (KR); Sang-Wook Kwon, Suwon-si (KR); Kyung-Kyu Kim, Suwon-si (KR); Young-Joong Mok, Suwon-si (KR); Sang-Kyu Baek, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/754,277

(22) PCT Filed: Aug. 22, 2016

(86) PCT No.: PCT/KR2016/009271
§ 371 (c)(1),
(2) Date: Feb. 21, 2018

(87) PCT Pub. No.: WO2017/034279
PCT Pub. Date: Mar. 2, 2017

(65) Prior Publication Data
US 2018/0249390 A1 Aug. 30, 2018

(30) Foreign Application Priority Data

Aug. 21, 2015 (IN) ........................... 4389/CHE/2015

(51) Int. Cl.
*H04W 4/00* (2018.01)
*H04W 36/08* (2009.01)
(Continued)

(52) U.S. Cl.
CPC ............ *H04W 36/08* (2013.01); *H04L 47/34* (2013.01); *H04W 28/0231* (2013.01);
(Continued)

(58) Field of Classification Search
USPC .................................. 370/329, 331, 332, 336
See application file for complete search history.

(56) References Cited

U.S. PATENT DOCUMENTS 9,474,000 B2 * 10/2016 Kilpatrick, II .... H04W 36/0083
2013/0188575 A1 7/2013 Lee et al.
(Continued)

FOREIGN PATENT DOCUMENTS

KR 10-2013-0085300 A 7/2013
KR 10-2013-0134889 A 12/2013
(Continued)

OTHER PUBLICATIONS

International Search Report dated Oct. 24, 2016 in connection with International Patent Application No. PCT/ KR2016/009271.
(Continued)

*Primary Examiner* — Phuongchau Ba Nguyen

(57) ABSTRACT

The present disclosure relates to a 5G or pre-5G communication system that is to support higher data transmission rates after 4G communication systems such as LTE. A method, by a MeNB, for switching a SeNB communicating with a UE in a wireless communication system, provided in an embodiment of the present disclosure, includes receiving, from the UE, a measurement report (MR) of the at least two SeNB neighboring with the UE, determining whether predetermined switch criteria are satisfied based on the MR, and transmitting, to the UE and a first SeNB or a second SeNB, a switch message indicating switching of an SeNB cooper-
(Continued)

ating with the MeNB for communication with the UE from the first SeNB to the second SeNB, based on whether the switch criteria are satisfied.

20 Claims, 15 Drawing Sheets

(51) Int. Cl.
| | | |
|---|---|---|
| *H04W 76/20* | (2018.01) | |
| *H04W 76/10* | (2018.01) | |
| *H04L 12/801* | (2013.01) | |
| *H04W 28/02* | (2009.01) | |
| *H04W 36/00* | (2009.01) | |
| *H04W 24/10* | (2009.01) | |
| *H04W 84/04* | (2009.01) | |

(52) U.S. Cl.
CPC ....... *H04W 36/0069* (2018.08); *H04W 76/10* (2018.02); *H04W 76/20* (2018.02); *H04W 24/10* (2013.01); *H04W 36/0058* (2018.08); *H04W 84/045* (2013.01)

(56) References Cited

U.S. PATENT DOCUMENTS

| | | |
|---|---|---|
| 2014/0023040 A1 | 1/2014 | Son et al. |
| 2015/0038140 A1* | 2/2015 | Kilpatrick, II ........ H04W 64/00 455/436 |
| 2015/0043492 A1 | 2/2015 | Baek et al. |
| 2015/0230221 A1 | 8/2015 | Kim et al. |

FOREIGN PATENT DOCUMENTS

| | | |
|---|---|---|
| KR | 10-2014-0137280 A | 12/2014 |
| KR | 10-2015-0020510 A | 2/2015 |

OTHER PUBLICATIONS

Written Opinion of the International Searching Authority dated Oct. 24, 2016 in connection with International Patent Application No. PCT/KR2016/009271.

* cited by examiner

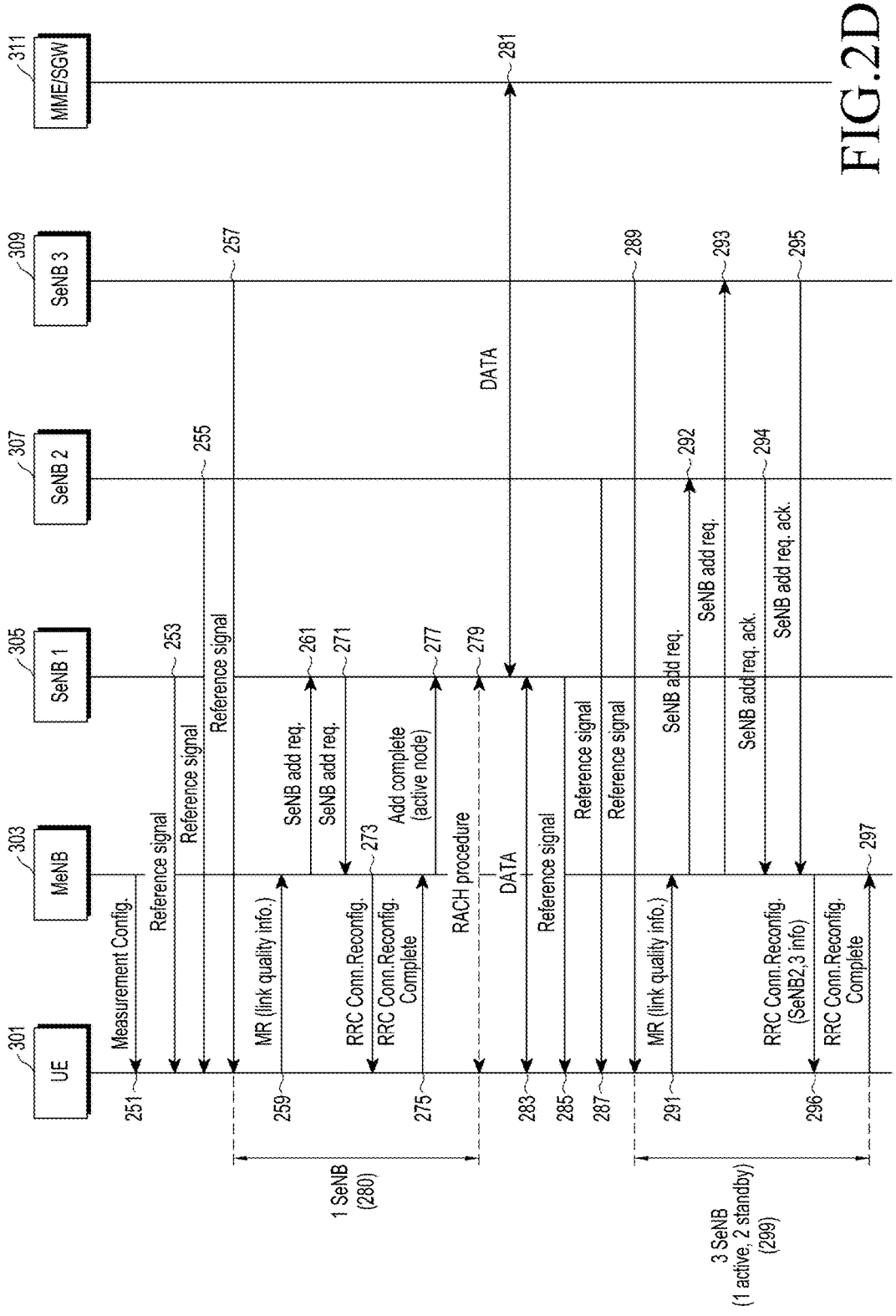

METHOD AND APPARATUS FOR CHANGING BASE STATION IN WIRELESS COMMUNICATION SYSTEM

CROSS-REFERENCE TO RELATED APPLICATIONS AND CLAIM OF PRIORITY

This application is a 371 National Phase Entry of PCT International Application No. PCT/KR2016/009271 filed on Aug. 22, 2016 which claims priority to India Patent Application No. 4389/CHE/2015 filed on Aug. 21, 2015, each of which are incorporated herein by reference into the present disclosure as if fully set forth herein.

TECHNICAL FIELD

The present disclosure relates to a method and apparatus for switching a base station supporting a terminal in a wireless communication system.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long-Term Evolution (LTE) system.

To achieve a high data rate, implementation of the 5G communication system in an ultra-high frequency (mmWave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Recently, several broadband wireless technologies have been developed to meet the growing number of broadband subscribers and to provide more and better applications and services. Examples of broadband systems include Code Division Multiple Access 2000 (CDMA 2000), 1× Evolution Data Optimized (1×EVDO) and Ultra Mobile Broadband (UMB) systems of the $3^{rd}$-Generation Partnership Project 2 (3GPP2), Wideband Code Division Multiple Access (WCDMA), High Speed Packet Access (HSPA) and Long Term Evolution (LTE) systems of the $3^{rd}$ Generation Partnership Project (3GPP), and Mobile Worldwide Interoperability for Microwave Access (WiMAX) systems of the Institute of Electrical and Electronics Engineers.

With the advent of new schemes and devices, there is an increasing need for a mobile communication system having large capacity, coverage and better reliability to support critical communication applications, real time applications, and web applications. One of ways to meet the need is allowing a user equipment (UE) to simultaneously connect to multiple enhanced NodeBs (eNBs) or base stations (BSs).

In a current state-of-the-art mobile communication system based on the 3GPP LTE standard, a UE is allowed to connect to two eNBs. One of the eNBs is a master eNB (MeNB) and another one of the eNBs is a secondary eNB (SeNB). The UE may receive or transmit data from or to these eNBs at the same time. In the current approach, when the signal quality of the SeNB with which the UE is communicating is degraded, the MeNB triggers release of the existing SeNB to perform an operation of releasing the existing SeNB and adding a new SeNB.

SUMMARY

An embodiment of the present disclosure provides a method and apparatus for switching an SeNB in a wireless communication system.

An embodiment of the present disclosure provides a method and apparatus for determining SeNB switch criteria by an MeNB in a wireless communication system.

An embodiment of the present disclosure provides a method and apparatus for determining SeNB switch criteria by a UE in a wireless communication system.

An embodiment of the present disclosure provides a method and apparatus for allocating a resource used for a UE to transmit an SeNB switch message in a wireless communication system.

A method for switching a secondary evolved NodeB (SeNB) communicating with a user equipment (UE) by a main eNB (MeNB) in a wireless communication system supporting the MeNB and at least two SeNBs, provided in an embodiment of the present disclosure, includes receiving a measurement report (MR) on nearby SeNBs around the UE from the UE, determining whether predetermined SeNB switch criteria are satisfied based on the MR, and transmitting, to the UE and a first SeNB, which is in communication with the UE, or a second SeNB, which is not in communication with the UE, an SeNB switch message indicating switching of an SeNB for communication with the UE from the first SeNB to the second SeNB, if the SeNB switch criteria are satisfied.

A method for switching an SeNB communicating with a UE by the UE in a wireless communication system supporting an MeNB and at least two SeNBs, provided in an embodiment of the present disclosure, includes performing measurement with respect to a first SeNB and a second SeNB around the UE, determining whether predetermined SeNB switch criteria are satisfied based on an MR, and transmitting, to the MeNB or the second SeNB, which is not in communication with the UE, an SeNB switch message indicating switching of an SeNB for communication with the UE from the first SeNB to the second SeNB, if the SeNB switch criteria are satisfied.

A method for switching an SeNB communicating with a UE by an MeNB in a wireless communication system supporting the MeNB and at least two SeNBs includes receiving, from the UE, an SeNB switch message indicating switching of an SeNB for communication with the UE from a first SeNB to a second SeNB, transmitting the SeNB switch message to the first SeNB; receiving, from the first SeNB, sequence number (SN) information of a packet transmitted last to the UE by the first SeNB, transmitting the SN information to the second SeNB, and transmitting a next packet following the packet corresponding to the SN information to the second SeNB.

An apparatus of an MeNB for switching an SeNB communicating with a UE in a wireless communication system supporting the MeNB and at least two SeNBs, provided in an embodiment of the present disclosure includes a transceiver configured to receive a measurement report (MR) on nearby SeNBs around the UE from the UE, and a controller configured to determine whether predetermined SeNB switch criteria are satisfied based on the MR, and to transmit, to the UE and a first SeNB, which is in communication with the UE, or a second SeNB, which is not in communication with the UE, an SeNB switch message indicating switching of an SeNB for communication with the UE from the first SeNB to the second SeNB, if the SeNB switch criteria are satisfied.

An apparatus of a UE for switching an SeNB communicating with a UE in a wireless communication system supporting the MeNB and at least two SeNBs, provided in an embodiment of the present disclosure includes a controller configured to perform measurement with respect to a first SeNB and a second SeNB around the UE and to determine whether predetermined SeNB switch criteria are satisfied based on an MR, and a transceiver configured to transmit, to the MeNB or the second SeNB, which is not in communication with the UE, an SeNB switch message indicating switching of an SeNB for communication with the UE from the first SeNB to the second SeNB, if the SeNB switch criteria are satisfied.

An apparatus of an MeNB for switching an SeNB communicating with a UE in a wireless communication system supporting the MeNB and at least two SeNBs, provided in an embodiment of the present disclosure includes a transceiver configured to receive, from the UE, an SeNB switch message indicating switching of an SeNB for communication with the UE from a first SeNB to a second SeNB, to transmit the SeNB switch message to the first SeNB, to receive, from the first SeNB, sequence number (SN) information of a packet transmitted last to the UE by the first SeNB, to transmit the SN information to the second SeNB, and to transmit a next packet following the packet corresponding to the SN information to the second SeNB, and a controller configured to control operations of the transceiver.

BRIEF DESCRIPTION OF DRAWINGS

FIG. 2D is a ladder diagram for describing a process of configuring an active eNB and a standby eNB according to an embodiment of the present disclosure;

DETAILED DESCRIPTION

Figure 1A:
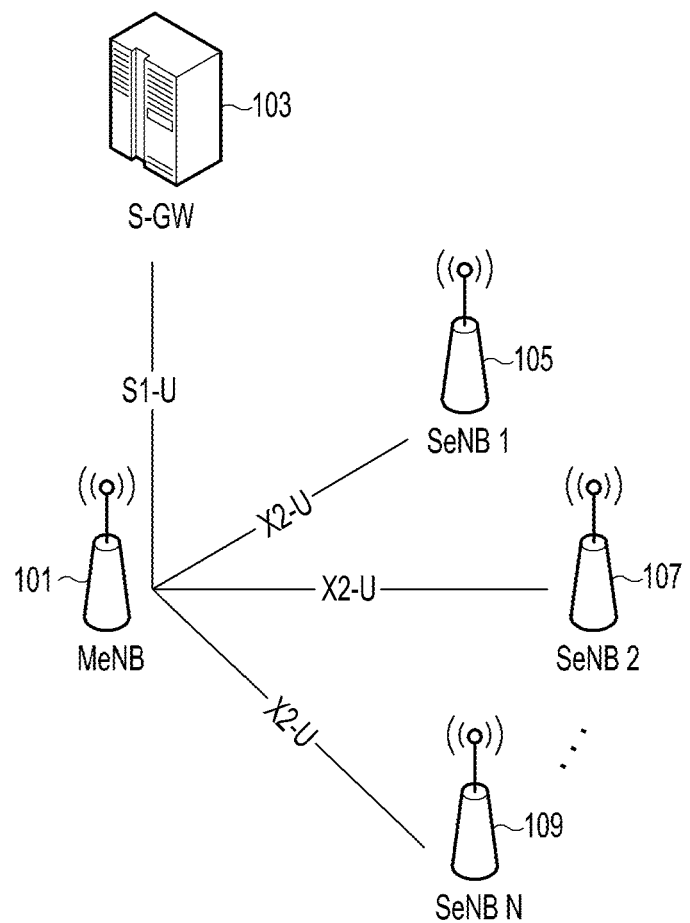
FIG. 1A illustrates a broadband communication system according to an embodiment of the present disclosure.

In the following description of the present disclosure, a detailed description of well-known functions or elements associated with the present disclosure will be omitted if it unnecessarily obscures the subject matter of the present disclosure. Hereinafter, embodiments of the present disclosure will be described with reference to the accompanying drawings.

The following embodiments of the present disclosure will be separately described for convenience, but at least two embodiments may be implemented in combination without colliding with each other.

Further, the terminologies to be described below are defined in consideration of functions in the embodiments of the present disclosure and may vary depending on a user's or operator's intention or practice. Therefore, the definitions should be made based on the contents throughout the entire description of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments.

Hereinafter, various embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted. In the following description, only parts necessary for understanding of operations according to embodiments of the present disclosure will be described and other parts will not be described not to obscure the subject matter of the present disclosure.

The apparatus and method proposed in the present disclosure are applicable to various communication systems such as a Long-Term Evolution (LTE) mobile communication system, an LTE-Advanced (LTE-A) mobile communication system, a high speed downlink packet access (HSDPA) mobile communication system, a high speed uplink packet access (HSDPA) mobile communication system, a high rate packet data (HRPD) mobile communication system of the 3GPP2, a wideband code division multiple access (WCDMA) mobile communication system of the 3GPP2, a code division multiple access (CDMA) mobile communication system of the 3GPP2, the Institute of Electrical and Electronics Engineers (IEEE) 802.16m communication system, an evolved packet system (EPS), a mobile Internet Protocol (IP) system, and so forth.

Before the present disclosure is described in detail, the main concept of the present disclosure will be described in brief.

In the present disclosure, a master evolved NodeB (MeNB) or a user equipment (UE) determines secondary eNB (SeNB) switch criteria for switching an SeNB communicating with the UE, and transmits an SeNB switch message to related entities to switch the SeNB if the SeNB switch criteria are satisfied. In the present disclosure, representative five embodiments will be proposed in FIGS. 3 through 7.

FIG. 1A illustrates a broadband communication system according to an embodiment of the present disclosure.

Referring to FIG. 1A, in an embodiment of the present disclosure, a broadband communication system may include an MeNB 101, SeNBs 105, 107, and 109, a serving gateway (S-GW) 103, and a UE (not shown).

The SeNBs 105, 107, and 109 may indicate transmission/reception (TX/RX) points connected to a central controller, the MeNB 101. In an embodiment, the MeNB 101 may be connected to the S-GW 103 and may be a 4G eNB or 5G eNB.

Figure 1B:
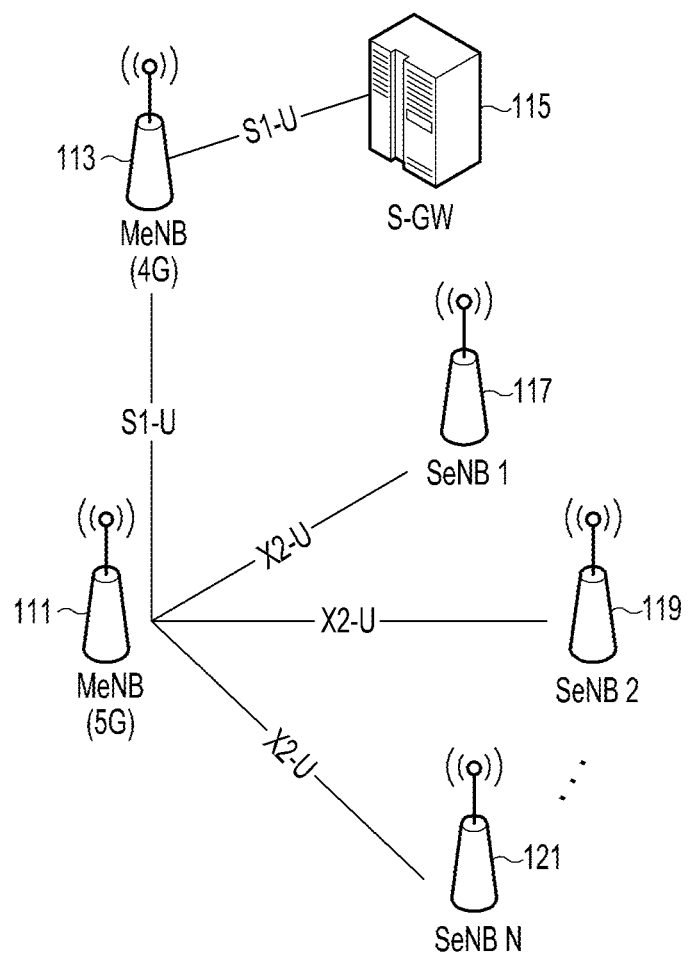
FIG. 1B illustrates a broadband communication system according to another embodiment of the present disclosure.

FIG. 1B illustrates a broadband communication system according to another embodiment of the present disclosure.

In an embodiment illustrated in FIG. 1B, an MeNB 111 may be connected to another MeNB 113. Herein, SeNBs 117, 119, and 121 or the MeNB 113 connected to the TX/RX points may be 5G eNBs and may be connected to the 4G eNB 113. The 4G eNB 113 is connected to an S-GW 115. In another embodiment, the 5G eNB 111 and the 4G eNB 113 may be combined together.

In the present disclosure, an SeNB may be a small-cell BS. The small-cell BS operates at LTE frequencies or mmWave frequencies or frequencies higher than or lower than LTE. The small-cell BS may be a BS having a cellular technique, a Wireless Fidelity (Wi-Fi) technique, or a Wireless Gigabit Alliance (WiGig) technique. The small-cell BS having the same capability as a macro-cell BS performs some of normal functions of a BS such as an SeNB according to the present disclosure (for example, except for a radio resource control (RRC) function).

In another embodiment, the small-cell BS has a smaller capability than the macro-cell BS and may be one TX point, have only functions of Layer 1 (i.e., a physical layer) or have only functions of Layer 1 and a medium access control (MAC) lower layer.

In the present disclosure, the UE is connected to the MeNB and multiple SeNBs. For example, the UE is connected with the MeNB and N SeNBs (herein, N>1). One or multiple SeNBs, that is, M SeNBs among N SeNBs are referred to as active (or activated) SeNBs (herein, M<=N).

The UE performs transmission and reception of data with active SeNBs. In an embodiment, active SeNBs for a downlink (DL) and an uplink (UP) may be different from one another. Out of the N SeNBs, SeNBs except for the active SeNBs are referred to as standby eNBs. Although the standby eNBs have already been configured, the standby eNBs do not participate in data transmission and/or reception with the UE. The UE has a configuration of Layer 1/Layer 2 (L1/L2) needed for communication with the standby eNBs. This configuration is provided when the SeNBs are added and/or configured to the UE.

Meanwhile, the UE periodically or aperiodically transmits measurement reports for reporting states of nearby eNBs to the MeNB. Based on the measurement report, the MeNB adds or configures an SeNB. The standby eNBs include UE state information. In addition to the active eNBs and the standby eNBs, a set of eNBs among N SeNBs with which the UE maintains DL/UL synchronization may be configured to the UE. The one set may include at least the active SeNBs.

With respect to the DL, the MeNB transmits DL data to the SeNB through multicast or unicast. In case of unicast, the MeNB transmits data only to the active SeNB. In this case, data transmitted to the SeNB is data needed to be transmitted to the SeNB. For multicast, the MeNB transmits the same data to standby eNBs in addition to the active SeNB. This is intended to reduce a delay caused by data transmission at the time when the standby eNB is switched to the active SeNB.

Figure 2A:
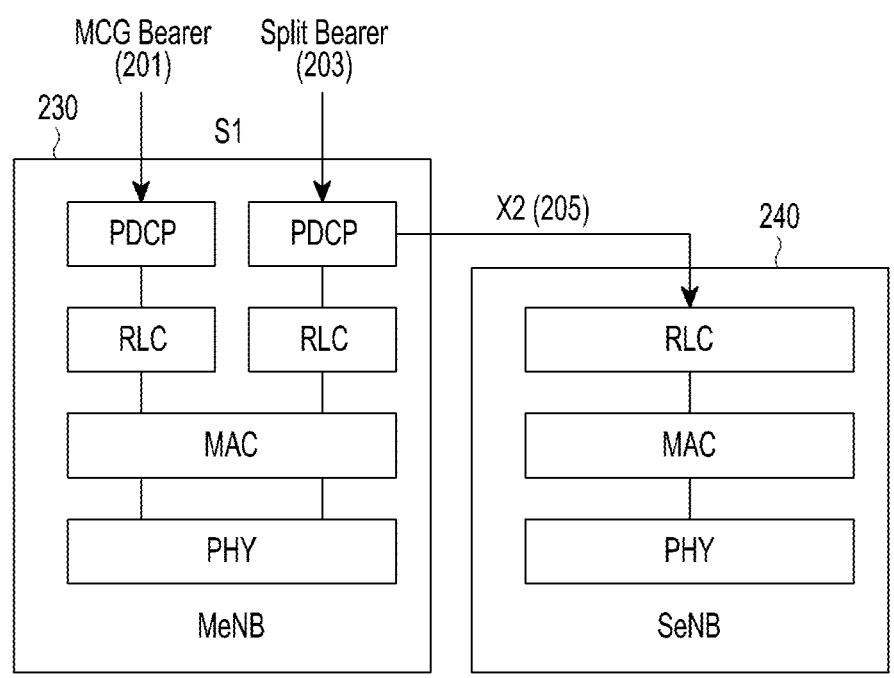
FIGS. 2A through 2C illustrate examples of several protocols available for data communication according to an embodiment of the present disclosure.
Figure 2B:
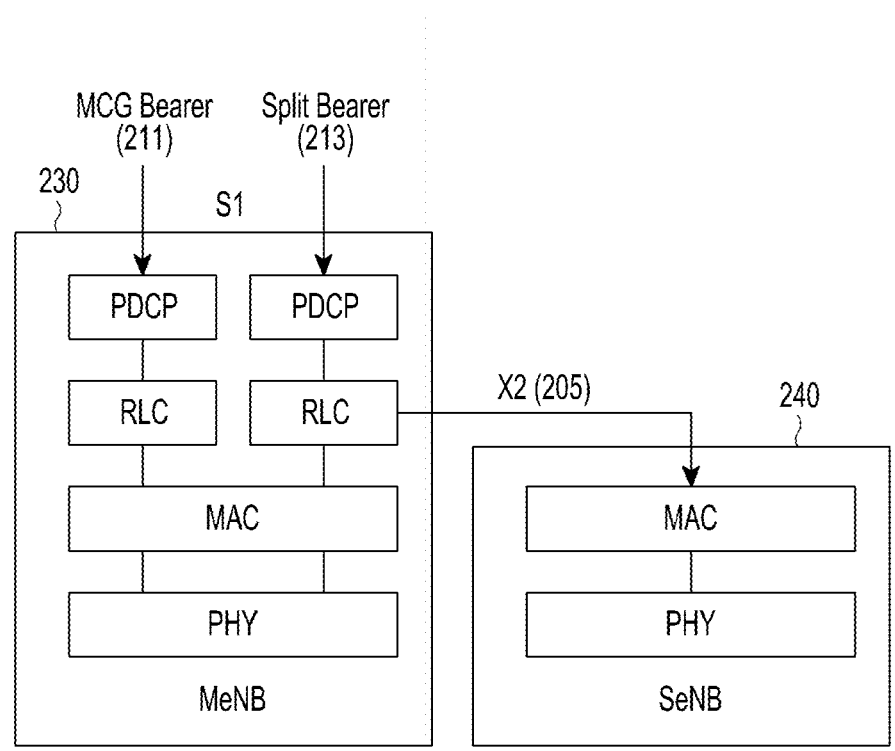
Figure 2C:
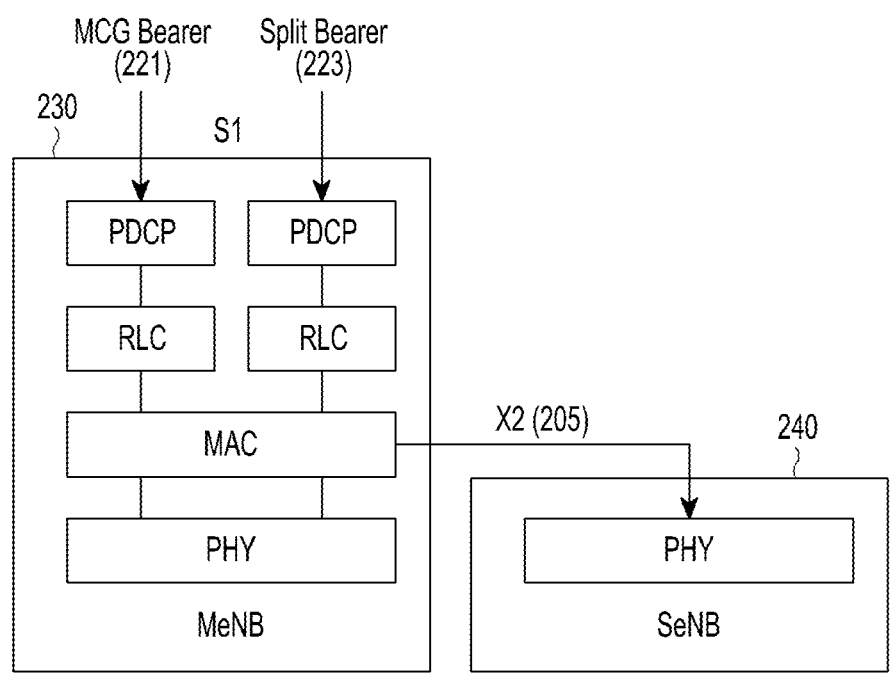

FIGS. 2A through 2C illustrate examples of several protocols available for data communication according to an embodiment of the present disclosure.

In FIG. 2A, an MeNB 230 includes two types of bearers. One of them is a master cell group (MCG) bearer 201, and the other is a split bearer 203. Both the bearers are intended to support one UE. Herein, packet data convergence protocol (PDCP) PDUs are transmitted to an SeNB 240 through an X2 interface. The SeNB 240 performs processing of radio link control (RLC), MAC, and physical (PHY) layers with respect to the received PDCP PDUs.

In FIG. 2B, the MeNB 230 includes two types of bearers. One of them is an MCG bearer 211, and the other is a split bearer 213. Both the bearers are intended to support one UE. In FIG. 2B, RLC PDUs are transmitted to the SeNB 240 through an X2 interface 205. The SeNB 240 performs MAC and PHY processing with respect to the received RLC PDUs. In an embodiment, some RLC functions may also be executed in the SeNB 240.

In FIG. 2C, the MeNB 230 includes two types of bearers. One of them is an MCG bearer 221, and the other is a split bearer 223. Both the bearers are intended to support one UE. In FIG. 2C, MAC PDUs are transmitted to the SeNB 240. The SeNB 240 performs PHY processing with respect to the received MAC PDUs.

FIG. 2D is a ladder diagram for describing a process of configuring an active eNB and a standby eNB according to an embodiment of the present disclosure. An MeNB 303 configures the above described set of N SeNBs by using a measurement configuration message. The measurement configuration message may include at least one of an absolute threshold value for absolute comparison of received power, a relative threshold value for relative comparison of received power, a definition of an event (e.g., events A1-A5 of LTE, etc.) indicating a power comparison scheme (absolute comparison or relative comparison), and frequency information for power measurement. Referring to FIG. 2D, the MeNB 303 transmits the measurement configuration message to a UE 301 in operation 251. Meanwhile, SeNBs 305, 307, 309, and 311 transmit reference signals to the UE 301, respectively, in operations 253, 255, and 257.

The UE 301 measures the received signal power of reference signals received through cells of the SeNBs based on information included in the measurement configuration message, and if a cell of an SeNB having the measured received signal power exceeding the absolute threshold value is detected or if a cell having a result of applying a predetermined offset to the received signal power of a current serving cell, which exceeds the relative threshold value, is detected, then the UE 301 transmits a measurement report (MR) including the received signal power of the detected cell and an ID of the detected cell to the MeNB 303 in operation 259. The MeNB 303 having received the MR transmits an SeNB add request to the SeNB corresponding to the detected cell in operation 261. In FIG. 2D, the SeNB corresponding to the detected cell is assumed to be an SeNB 1 305. The SeNB 1 305 having received the SeNB add request determines to add the UE 301 to the SeNB 1 305 based on its resource capacity, and transmits a response message to the MeNB 303 in operation 271. In this case, if necessary, at least one of a random-access channel (RACH) preamble, a UE context fetch, and access-related information needed for the UE 301 to access the SeNB 1 305 later may be included in the response message. The MeNB 303 having received the response message includes at least one of the information included in the response message in a radio resource control (RRC) connection reconfiguration message and transmits the RRC connection reconfiguration message to the UE 301 in operation 273. The UE 301 completes radio resource-related configuration by using the received information and transmits an RRC reconfiguration complete message to the MeNB 303 in operation 275, and the MeNB 303 transmits an SeNB add complete message to the SeNB 1 305 in operation 277. Through the above-described process, the MeNB 303 configures an active eNB and standby eNBs. That is, through processes included in 208, the SeNB is configured as an active eNB.

The SeNB 1 305 configured as the active eNB performs data transmission and reception with the UE 301. That is, the SeNB receives DL data from the MME/SGW 311 in operation 281 and transmits the DL data to the UE 301 in operation 283, or receives UL data from the UE 301 in operation 283 and transmits the UL data to the MME/SGW 311 in operation 281.

Meanwhile, the SeNB 1 305 configured as the active eNB and other SeNBs 307 and 309 that are not configured to the UE 301 periodically (or aperiodically) transmit reference signals to the UE 301, respectively, in operations 285, 287, and 289. The UE 301 measures the received signal quality of the reference signals as described in operation 259 and transmits an MR to the MeNB 303 in operation 291. The MeNB 303 adds the SeNB 2 307 and the SeNB 3 309 as standby SeNBs based on the MR. That is, the SeNB 2 307 is added as the standby SeNB in operations 292 and 293, and the SeNB 3 309 is added as the standby SeNB in operations 294 and 295. Meanwhile, the MeNB 303 notifies the UE 301 that the SeNB 2 307 and the SeNB 3 309 are added as standby SeNBs through an RRC connection reconfiguration message in operation 296, and the UE 301 transmits a response thereto to the MeNB 303 in operation 297. Through processes included in 299, two standby SeNBs are configured in the UE 301. As a result, one active SeNB and two standby SeNBs are configured to the UE 301. As described above, the MeNB 303 configures SeNBs as an active SeNB or a standby SeNB based on the MR received from the UE 301.

Hereinbelow, five embodiments for switching an SeNB proposed in the present disclosure will be described. While embodiments have been described based on a DL operation for convenience, an UL operation may also be performed in the same manner. An operation indicated by a dotted line in the drawings of the embodiments is an optional operation that may be performed if needed.

Meanwhile, embodiments to be described below may be roughly classified into two types. That is, the embodiments may be classified into embodiments of FIGS. 4, 5, and 6 in which a UE determines SeNB switch criteria and embodiments of FIGS. 3 and 7 in which an MeNB determines SeNB switch criteria.

Figure 3:
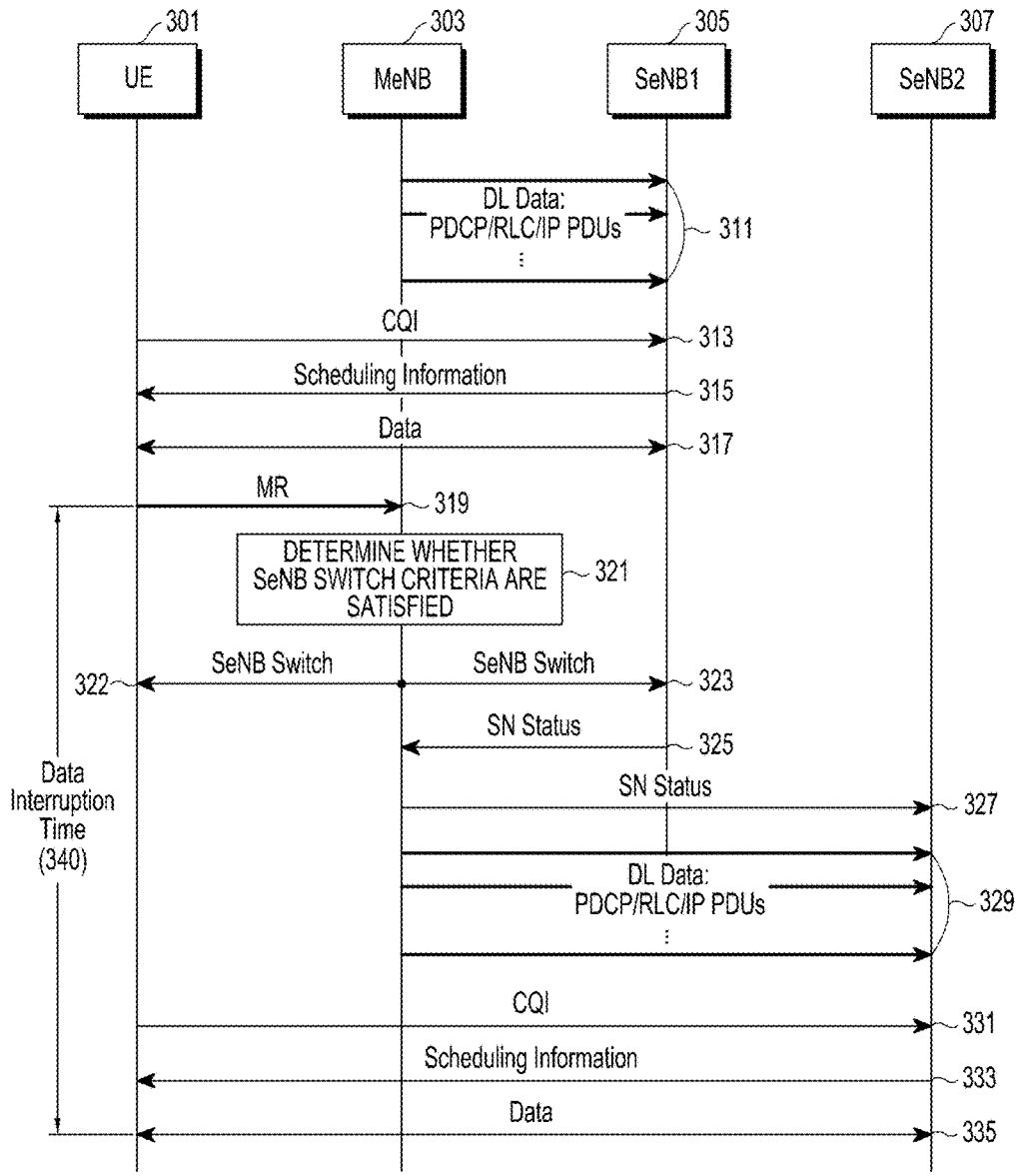
FIG. 3 is a ladder diagram for describing a method for switching an SeNB according to a first embodiment of the present disclosure.

FIG. 3 is a ladder diagram for describing a method for switching an SeNB according to a first embodiment of the present disclosure.

FIG. 3 assumes a situation where the UE 301 is connected with the MeNB 303 and is in an RRC-connected state, and the SeNB 1 305 and the SeNB 2 307 exist. Herein, the SeNB 1 305 is in an active state and the SeNB 2 307 is in a standby state. Thus, the SeNB 1 305 transmits and receives data to and from the UE 301 through a split bearer. Meanwhile, the UE 301 maintains synchronization with both the SeNB 1 305 and the SeNB 2 307 and is related to both the SeNB 1 305 and the SeNB 2 307 through UE context information and/or radio access information.

Referring to FIG. 3, the MeNB 303 transmits DL data (a PDCP, RLC, MAC or IP packet) for the UE 301 to the SeNB 1 305 through the split bearer in operation 311. The UE 301 periodically or aperiodically reports a channel condition to the SeNB 1 305 through a channel quality indicator (CQI)

report message in operation 313. For reference, the UE 301 may recognize information for CQI report through an additional procedure for the CQI report. Based on the CQI report, the SeNB 1 305 transmits scheduling information (time and frequency resource information, a modulation and coding scheme (MCS) level, hybrid automatic repeat and request (HARD) information, etc.) in operation 315. The UE 301 having received the scheduling information receives data at scheduled time according to the scheduling information in operation 317.

The UE 301 periodically or aperiodically transmits an MR to the MeNB 303 in operation 319. The MR is a report for a channel condition of nearby SeNBs, and may include, for example, a reference signal received power (RSRP), a signal-to-noise ratio (SNR), and so forth.

The MeNB 303 determines whether predetermined SeNB switch criteria are satisfied based on the MR in operation 321. More specifically, the MeNB 303 deactivates the current SeNB based on criteria of the SeNB such as SeNB's load balancing, an SeNB's location, an SeNB's channel condition, and so forth, and determines whether to activate a new SeNB. In the example of FIG. 3, it is assumed that the current SeNB 1 305 has a poor channel condition and the SeNB 2 307 has a good channel condition, and the MeNB 303 determines whether SeNB switch criteria are satisfied based on the channel conditions of the SeNB 1 305 and the SeNB 2 307, and if the SeNB switch criteria are satisfied, the MeNB 303 determines to switch the SeNB. For example, if the channel condition of the SeNB 1 305 is equal to or less than a first threshold value and the channel condition of the SeNB 2 307 is greater than or equal to a second threshold value, the MeNB 303 determines that the SeNB switch criteria are satisfied.

If the SeNB switch criteria are satisfied, the MeNB 303 transmits an SeNB switch message to the UE 301 and the SeNB 305 in operation 323.

The SeNB 1 305 having received the SeNB switch message transmits information about a sequence number (SN) of a packet whose transmission to the UE is paused and an SN of the last packet transmitted to the UE to the MeNB 303 in operation 325. The MeNB 303 transmits the SN information to the SeNB 2 307 to continue transmission from the last packet in operation 327. After transmitting the SN information, the MeNB 303 transmits DL data (PDCP/RLC/IP packet) to the SeNB 2 307 in operation 329. An SN of a packet whose transmission starts is (SN+1).

After receiving the SeNB switch message in operation 322, the UE 301 performs bearer switching for the SeNB 2 307. The UE 301 maintains synchronization with the SeNB 2 307 after performing a procedure for CQI report. The UE 301 already recognizes an L2 parameter like a radio network temporary identity (RNTI) through an additional procedure. Thus, the UE 301 transmits a CQI report to the SeNB 2 307 in operation 331. For reference, the UE 301 may recognize information for CQI report through an additional procedure for the CQI report. The SeNB 2 307 configures a PHY parameter based on the CQI report received from the UE 301 and transmits scheduling information to the UE 301 in operation 333. The UE 301 receives a data packet from the SeNB 2 307 through the bearer switching in operation 335. For reference, a time from operations 319 through to operation 335 may be referred to as a "data interruption time".

Figure 4:
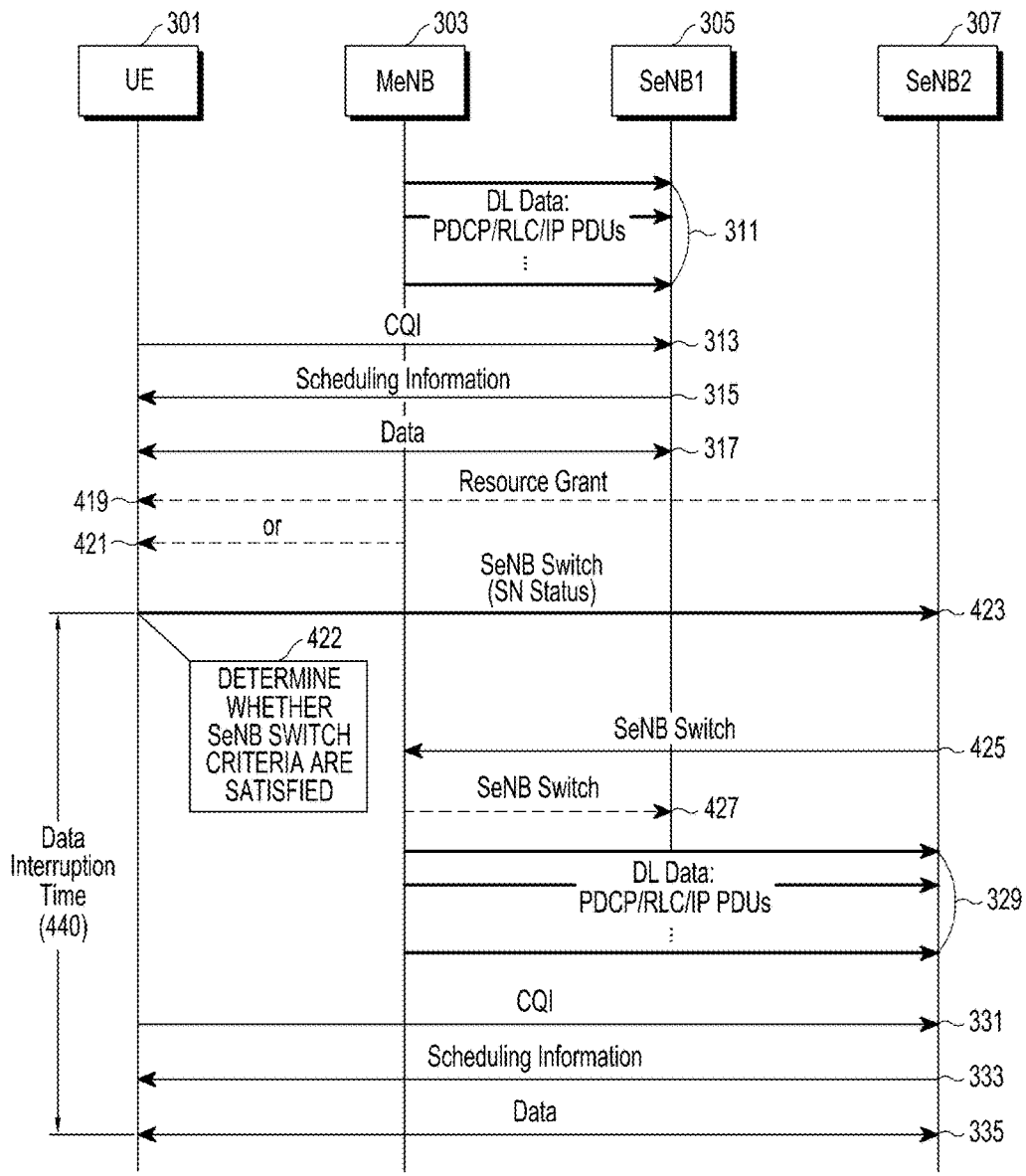
FIG. 4 is a ladder diagram for describing a method for switching an SeNB according to a second embodiment of the present disclosure.

FIG. 4 is a ladder diagram for describing a method for switching an SeNB according to a second embodiment of the present disclosure.

FIG. 4 will be described focusing on matters that are different from the procedure of FIG. 3.

Operations 311 through 317 are the same as described with reference to FIG. 3 and thus will not be described. Operation 419 or 421 is a process of allocating a resource for transmitting an SeNB switch message to the UE 301. In the present disclosure, the SeNB switch message transmitted by the UE 301 to the SeNB 2 307 may be transmitted using a resource allocated using various schemes.

First, when the UE 301 connects to the SeNB 2 307 by using dedicated RACH preamble/code/signal/time/frequency/time and frequency, the SeNB 2 307 may allocate a proper resource to the UE 301 to obtain the SeNB switch message which is then transmitted using the allocated resource.

Second, after the SeNB 2 307 is added, a resource is periodically allocated (semi-persistent scheduling), and the UE 301 transmits an indicator by using the allocated resource. Thereafter, the SeNB 2 307 re-allocates a proper resource to the UE 301 to obtain the SeNB switch message. In another way, the UE 301 may directly transmit the SeNB switch message to the SeNB 2 307 by skipping the indicator transmission process.

As described in the first and second schemes, a process for the SeNB 2 307 to allocate a resource for SeNB switch message transmission to the UE 301 is illustrated in operation 419.

In another scheme, the MeNB 303 may allocate a resource for the SeNB switch message to the UE 301. This is illustrated in operation 421.

The UE 301 may transmit the SeNB switch message by using bitmap information.

The UE 301 periodically or aperiodically performs measurement through which the UE 301 may identify a status of nearby SeNBs. The measurement result may include an RSRP, an SNR, and the like. Based on the measurement result, the UE 301 determines whether predetermined SeNB switch criteria are satisfied in operation 422. For example, if the channel condition of the SeNB 1 305 is equal to or less than a first threshold value and the channel condition of the SeNB 2 307 is greater than or equal to a second threshold value, the MeNB 303 determines that the SeNB switch criteria are satisfied. If the SeNB switch criteria are satisfied, the UE 301 performs bearer switching for the SeNB 2 307 and transmits the SeNB switch message to the SeNB 2 307 in operation 423. The SeNB switch message includes information about an SN of a packet received last from the SeNB 1 305.

Thereafter, the SeNB 2 307 transmits the SeNB switch message including the SN information to the MeNB 303 in operation 425. The MeNB 303 receives the SeNB switch message to check switching of the SeNB and transmits the SeNB message to the SeNB 1 305 to pause data transmission of the SeNB 1 305 in operation 427. The MeNB 303 sequentially transmits packets from $(SN+1)^{th}$ DL data (PDCP/RLC/IP packet) to the SeNB 2 307 in operation 429.

Operations 331 through 335 are the same as described with reference FIG. 3. Although the UE 301 receives the SeNB switch message from the MeNB 303 in FIG. 3, the UE 301 does not need to receive the SeNB switch message from the MeNB 303 as in FIG. 3 because the UE 301 determines whether to switch the SeNB in FIG. 5.

Thus, the UE 301 performs bearer switching for the SeNB 2 307 if determining that the SeNB switch criteria are satisfied. The UE 301 maintains synchronization with the SeNB 2 307 after performing a procedure for CQI report. The UE 301 already recognizes an L2 parameter like an RNTI through an additional procedure. Thus, the UE 301 transmits a CQI report to the SeNB 2 307 in operation 331.

For reference, the UE 301 may recognize information for CQI report through an additional procedure for the CQI report. The SeNB 2 307 configures a PHY parameter based on the CQI report received from the UE 301 and transmits scheduling information to the UE 301 in operation 333. The UE 301 receives a data packet from the SeNB 2 307 based on the switched bearer and the received scheduling information in operation 335.

A time from operation 422 through to operation 335 may be referred to as a "data interruption time".

Figure 5:
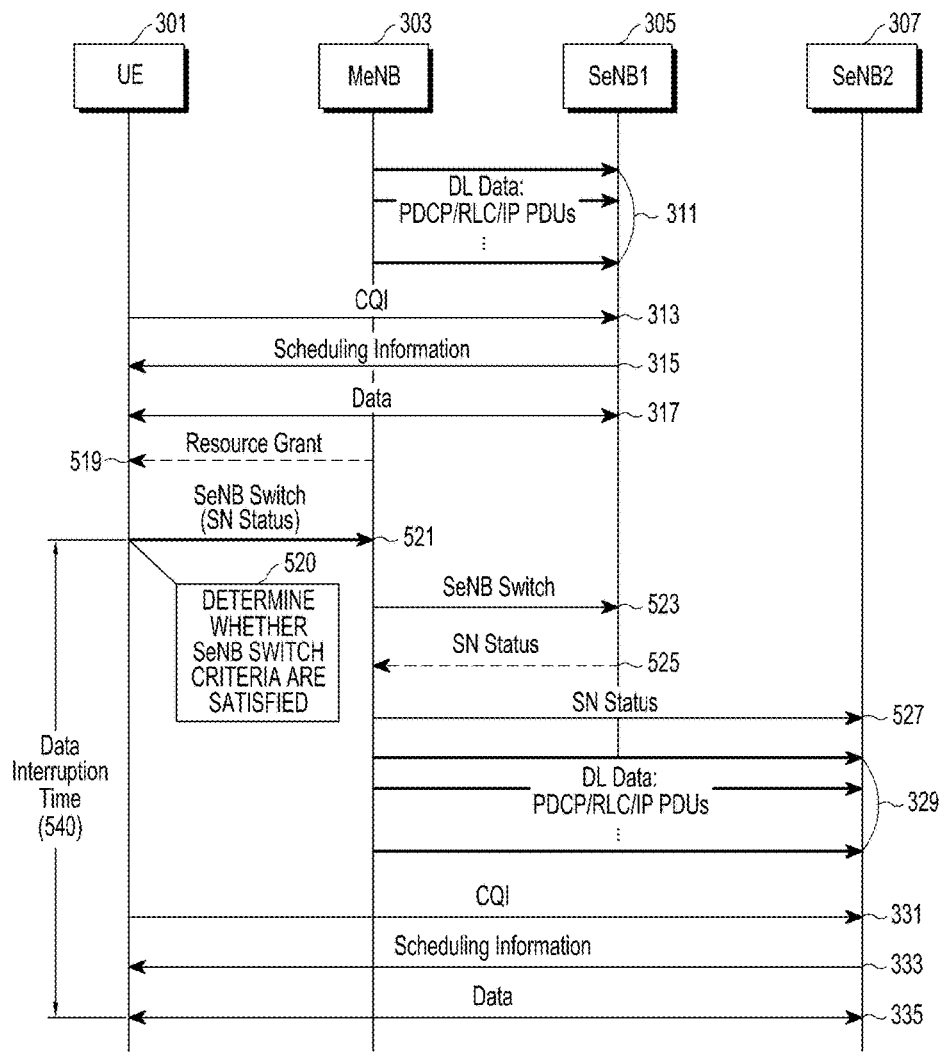
FIG. 5 is a ladder diagram for describing a method for switching an SeNB according to a third embodiment of the present disclosure.

FIG. 5 is a ladder diagram for describing a method for switching an SeNB according to a third embodiment of the present disclosure.

Operations 311 through 317 are the same as described with reference FIG. 3. Operation 519 is a process of allocating a resource for transmitting an SeNB switch message to the UE 301 if needed by the MeNB 303.

The UE 301 determines whether predetermined SeNB switch criteria are satisfied as described in operation 422 of FIG. 4, in operation 520. If the SeNB switch criteria are satisfied, the UE 301 performs bearer switching and transmits the SeNB switch message to the MeNB 303 in operation 521. The SeNB switch message includes SN information of the packet received last from the SeNB 1 305.

The MeNB 303 transmits the SeNB switch message to the SeNB 1 305 in operation 523. The SeNB 1 305 having received the SeNB switch message transmits SN information of the last transmitted packet to the MeNB 303 if necessary, in operation 525. Thereafter, the MeNB 303 transmits the SN information to the SeNB 2 307 in operation 527. The MeNB 303 then sequentially transmits packets from the $(SN+1)^{th}$ DL data (PDCP/RLC/IP packet) to the SeNB 2 307 in operation 329.

Operations 331 through 335 are the same as described with reference FIG. 4. A time from operation 520 through to operation 335 may be referred to as a "data interruption time".

Figure 6:
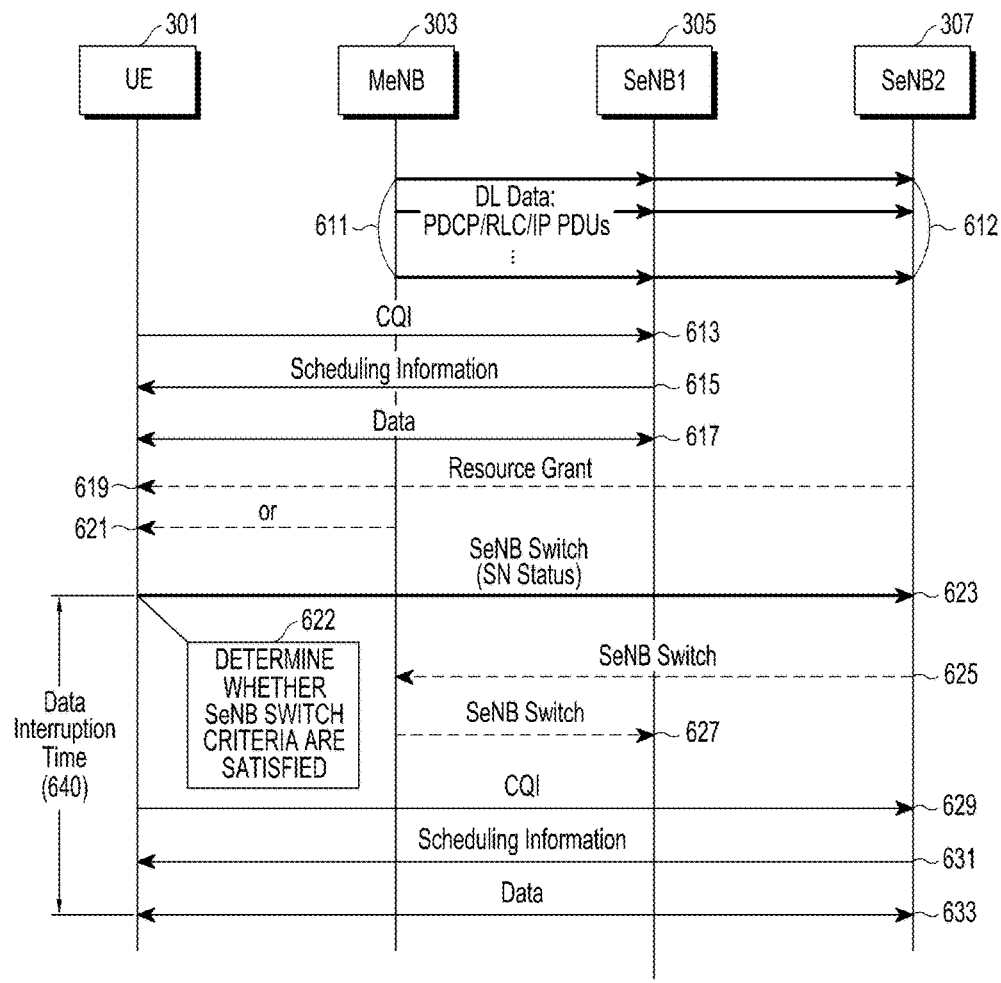
FIG. 6 is a ladder diagram for describing a method for switching an SeNB according to a fourth embodiment of the present disclosure.

FIG. 6 is a ladder diagram for describing a method for switching an SeNB according to a fourth embodiment of the present disclosure.

As described with reference to FIG. 3, FIG. 6 assumes a situation where the UE 301 is connected with the MeNB 303 and is in an RRC-connected state, and the SeNB 1 305 and the SeNB 2 307 exist. Herein, the SeNB 1 305 is in an active state and the SeNB 2 307 is in a standby state. Thus, the SeNB 1 305 transmits and receives data to and from the UE 301 through a split bearer. Unlike the description of the preceding embodiments, in FIG. 6, data is multicast to the SeNB 1 305 and the SeNB 2 307 by the MeNB 303 through an X2 interface. The SeNB 1 305 and the SeNB 2 307 store their received data in their buffers, respectively. The UE 301 maintains synchronization with both the SeNB 1 305 and the SeNB 2 307. The UE 301 is related to both the SeNB 1 305 and the SeNB 2 307 through UE context information and/or radio access information.

Referring to FIG. 6, the MeNB 303 transmits DL data (PDCP/RLC/IP packet) for the UE 301 to SeNBs through the split bearer in operations 611 and 612. Operations 613 through 617 are the same as operations 313 through 317 of FIG. 3.

Operation 619 or 621 is a process where the SeNB 2 307 or the MeNB 303 allocates a resource for transmitting the SeNB switch message to the UE 301 as in operation 419 or 421 described with reference to FIG. 4.

Operation 622 is a process where the UE 301 determines whether predetermined SeNB switch criteria are satisfied based on a result of measurement with respect to nearby SeNBs as described in operation 422 of FIG. 4. If the criteria are satisfied, the UE 301 performs bearer switching and transmits the SeNB switch message to the SeNB 2 307 in operation 623. The SeNB switch message includes information about an SN of a packet received last from the SeNB 1 305.

The SeNB 2 307 having received the SeNB switch message transmits the SeNB switch message to the MeNB 303, if necessary, to perform SeNB switching in operation 625, and the MeNB 303 transmits the SeNB switch message to the SeNB 1 305 to pause data transmission of the SeNB 1 305.

Operations 629 through 633 are the same as operations 331 through 335 of FIG. 4. A time from operation 622 through to operation 633 may be referred to as a "data interruption time".

Figure 7:
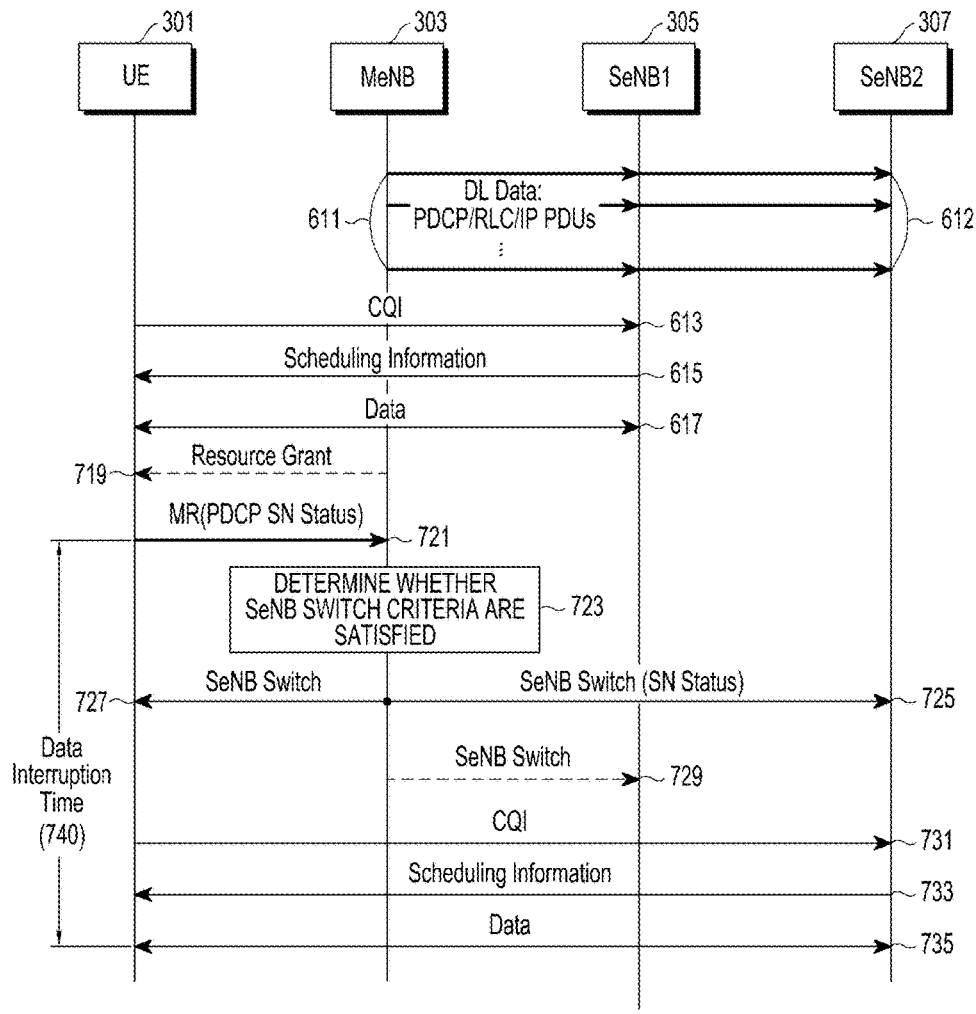
FIG. 7 is a ladder diagram for describing a method for switching an SeNB according to a fifth embodiment of the present disclosure.

FIG. 7 is a ladder diagram for describing a method for switching an SeNB according to a fifth embodiment of the present disclosure.

Operations 611 through 617 of FIG. 7 are the same as described with reference to FIG. 6, and operations following operation 617 will be described. Operation 719 is a process where the MeNB allocates a resource needed for transmission of the SeNB switch message to the UE.

The UE 301 periodically or aperiodically transmits an MR to the MeNB 303 in operation 721. The MR is a report of channel conditions of nearby SeNBs of the UE 301, and may include, for example, an RSRP, an SNR, etc. In FIG. 7, the MR includes SN information of the last packet received by the UE 301.

The MeNB 303 determines whether predetermined SeNB switch criteria are satisfied based on the MR in operation 723, as described in operation 321 of FIG. 3. If the SeNB switch criteria are satisfied, the MeNB 303 transmits the SeNB switch message to the UE 301 and the SeNB 307 in operations 725 and 727. The SeNB switch message transmitted by the MeNB 303 includes SN information of the SeNB 2 307 and causes transmission of a data packet. The MeNB 303 transmits the SeNB switch message to the SeNB 1 305 to pause data transmission of the SeNB 1 305 in operation 729.

Operations 733 through 735 are the same as operations 331 through 335 of FIG. 3, and thus will not be described repetitively. After receiving the SeNB switch message, the UE 301 performs bearer switching for the SeNB 2 307. The UE 301 maintains synchronization with the SeNB 2 307 after performing a procedure for CQI report. The UE 301 already recognizes an L2 parameter like an RNTI through an additional procedure. Thus, the UE 301 transmits CQI report to the SeNB 2 307 in operation 731. For reference, the UE 301 recognizes information for the CQI report through an additional procedure for the CQI report. The SeNB 2 307 configures a PHY parameter based on the CQI report received from the UE 301 and transmits scheduling information to the UE 301 in operation 733. The UE 301 receives a data packet from the SeNB 2 307 through the bearer switching in operation 735. A time from operation 721 through to operation 735 may be referred to as a "data interruption time".

In the embodiments (FIGS. 4, 5, and 6) where the UE 301 determines the SeNB switch criteria, one of the SeNB switch criteria may correspond to a radio link failure (RLF) of the UE 301 for the current SeNB (i.e., the SeNB 1 305). In the embodiments (FIGS. 3 and 7) where the MeNB 303 determines the SeNB switch criteria, one of the SeNB switch criteria may correspond to a case where the MeNB 303 receives a report of an RLF for the current SeNB (i.e., the SeNB 1 305) from the UE 301.

Figure 8:
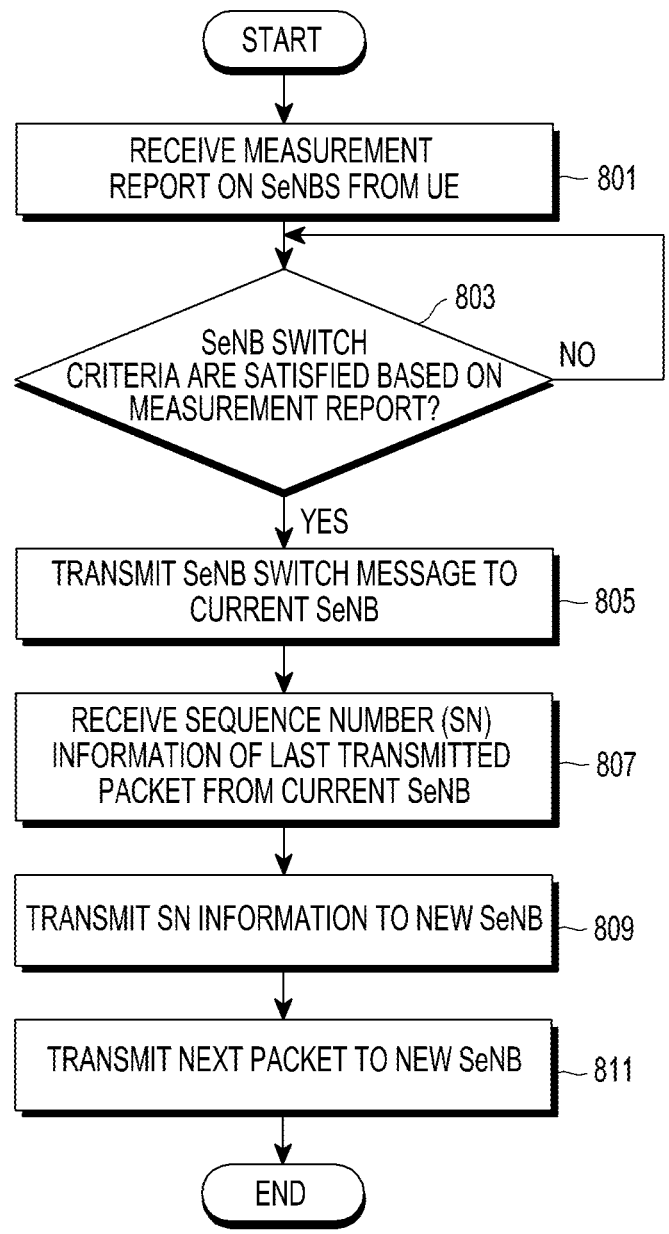
FIG. 8 is a flowchart of an operation of an MeNB according to the first embodiment of the present disclosure described with reference to FIG. 3.

FIG. 8 is a flowchart of an operation of the MeNB 303 according to the first embodiment of the present disclosure described with reference to FIG. 3.

The MeNB 303 receives an MR of nearby SeNBs (in the example of FIG. 3, the SeNB 1 305 and the SeNB 2 307) in operation 801, determines whether the SeNB switch criteria are satisfied based on the MR in operation 803, and transmits the SeNB switch message to the current SeNB if the SeNB switch criteria are satisfied in operation 805. Thereafter, the MeNB 303 receives SN information of the last transmitted packet from the current SeNB in operation 807, and transmits the SN information to a new SeNB in operation 809. The MeNB 803 then transmits the next packet to the new SeNB based on the SN information in operation 811.

Figure 9:
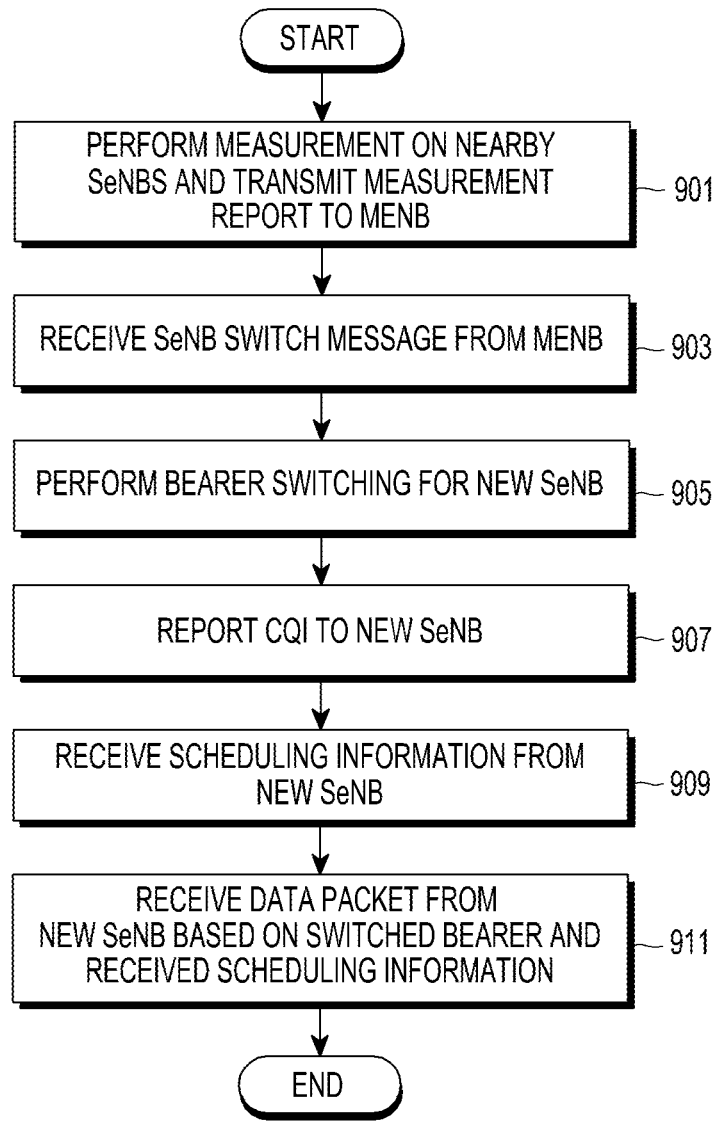
FIG. 9 is a flowchart of an operation of a UE according to the first embodiment of the present disclosure described with reference to FIG. 3.

FIG. 9 is a flowchart of an operation of the UE 301 according to the first embodiment of the present disclosure described with reference to FIG. 3.

The UE 301 performs measurement with respect to nearby SeNBs (in the example of FIG. 3, the SeNB 1 305 and the SeNB 2 307) and transmits the MR to the MeNB 303 in operation 901. The UE 301 receives the SeNB switch message indicating switching the current SeNB (i.e., the SeNB 1 305) to a new SeNB (i.e., the SeNB 2 307) from the MeNB 303 in operation 903. The UE 301 performs bearer switching for the SeNB 2 307 in response to the SeNB switch message in operation 905. The UE 301 performs a procedure for reporting a CQI to the new SeNB 2 307 and reports the CQI to the new SeNB in operation 907. The UE 301 receives scheduling information from the new SeNB in operation 909, and receives a data packet from the new SeNB based on the switched bearer and the received scheduling information in operation 911. The received data packet may be a next packet following the last packet received from the previous SeNB.

Figure 10:
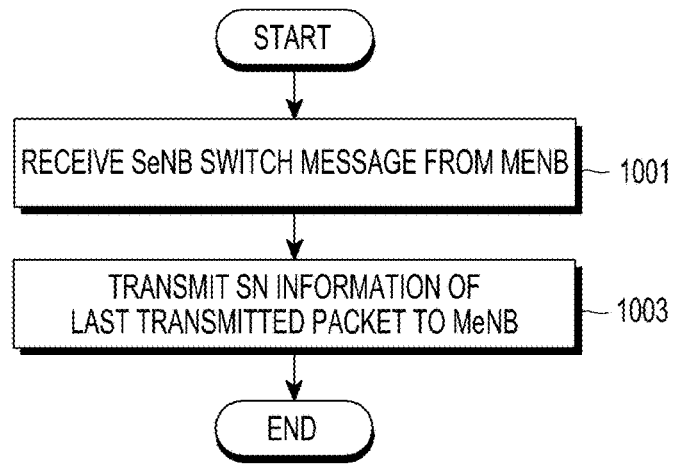
FIG. 10 is a flowchart of an operation of a current SeNB (i.e., an SeNB 1) according to the first embodiment of the present disclosure described with reference to FIG. 3.

FIG. 10 is a flowchart of an operation of the current SeNB (i.e., the SeNB 1 305) according to the first embodiment of the present disclosure described with reference to FIG. 3.

The current SeNB receives the SeNB switch message from the MeNB 303 in operation 1001. Thus, the current SeNB transmits SN information of the last transmitted packet to the MeNB 303 in operation 1003.

Figure 11:
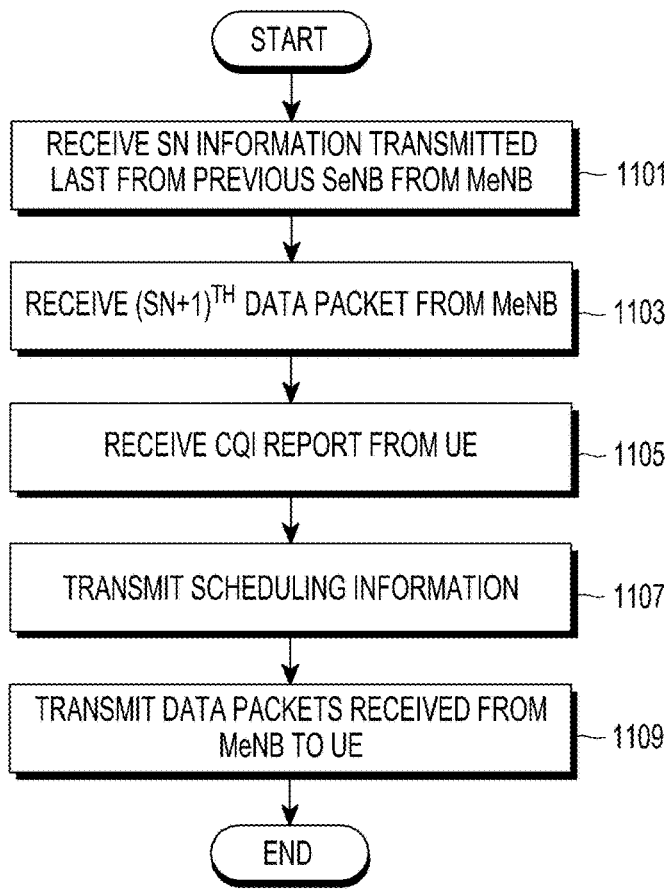
FIG. 11 is a flowchart of an operation of a new SeNB (i.e., an SeNB 2) according to the first embodiment of the present disclosure described with reference to FIG. 3.

FIG. 11 is a flowchart of an operation of the current SeNB (i.e., the SeNB 2 307) according to the first embodiment of the present disclosure described with reference to FIG. 3.

The new SeNB receives the SN information of the last packet transmitted by the previous SeNB from the MeNB 303 in operation 1101, and receives an $(SN+1)^{th}$ data packet from the MeNB 303 in operation 1103. The SeNB 2 301 receives a CQI report from the UE 301 in operation 1105, configures a PHY parameter based on the CQI report, and transmits scheduling information to the UE 301 in operation 1107. The SeNB 2 301 then transmits data packets received from the MeNB 303 to the UE 301 based on the scheduling information in operation 1109.

Operations of entities in the second through fifth embodiments described in FIGS. 4 through 7 may be easily understood from the description of FIGS. 4 through 7 and the description of FIGS. 9 through 11, and thus the operations of the entities in the second through fifth embodiments will not be described.

Figure 12:
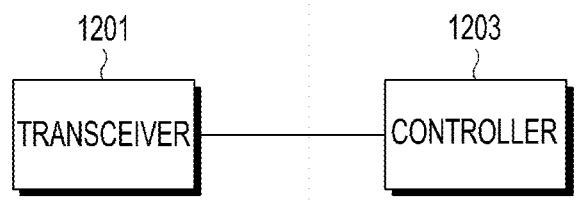
FIG. 12 is a block diagram of an MeNB that performs operations according to embodiments of the present disclosure.

FIG. 12 is a block diagram of the MeNB 303 that performs operations according to embodiments of the present disclosure.

A transceiver 1201 transmits and receives a message or data to and from the UE 301 or SeNBs.

A controller 1203 controls overall operations according to embodiments of the present disclosure.

For example, in the first embodiment of FIG. 3, the controller 1203 determines whether the SeNB switch criteria are satisfied, and if the SeNB switch criteria are satisfied, the controller 1203 generates the SeNB switch message and transmits the SeNB switch message to the UE 301 and the SeNB 1 305 through the transceiver 1201. The controller 1203 also transmits the SN information received from the SeNB 1 305 to the SeNB 2 307 through the transceiver 1201, and performs an operation of determining to transmit packets from the $(SN+1)^{th}$ packet to the SeNB 2 307 based on the SN information. The second through fifth embodiments may also be easily understood from the description of FIGS. 4 through 7 and thus will not be described in detail.

Figure 13:
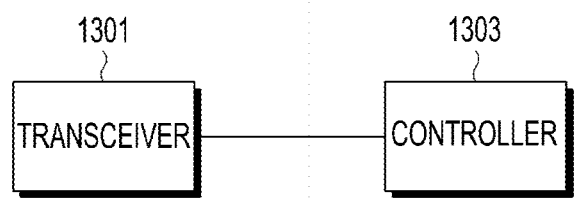
FIG. 13 is a block diagram of SeNBs that perform operations according to embodiments of the present disclosure.

FIG. 13 is a block diagram of SeNBs that perform operations according to embodiments of the present disclosure.

A transceiver 1301 transmits and receives a message or data to and from the UE 301 or the MeNB 303.

A controller 1303 controls overall operations according to embodiments of the present disclosure. In case of the SeNB 1 305, for example, upon receiving the SeNB switch message in the first embodiment, the controller 1303 determines SN information of the last packet transmitted by the SeNB 1 305, and transmits the determined SN information to the MeNB 303 through the transceiver 1301. In case of the SeNB 2 307, once the controller 1303 receives the SN information and DL data from the MeNB 303 and receives a CQI report from the UE 301 in the first embodiment, the controller 1303 configures a PHY parameter based on the CQI report, generates scheduling information for the UE 301, and transmits the scheduling information to the UE 301 through the transceiver 1301. The controller 1303 then transmits data packets received from the MeNB 303 to the UE 1301 through the transceiver 1301 based on the scheduling information.

Figure 14:
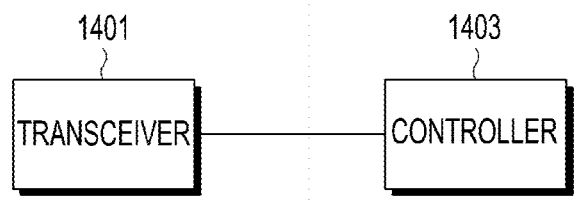
FIG. 14 is a block diagram of a UE that performs operations according to embodiments of the present disclosure.

FIG. 14 is a block diagram of the UE 301 that performs operations according to embodiments of the present disclosure.

A transceiver 1401 transmits and receives a message or data to and from the MeNB 303 or SeNBs.

A controller 1403 controls overall operations according to embodiments of the present disclosure.

For example, in the first embodiment of FIG. 3, the controller 1403 performs MR on the nearby SeNBs. If receiving the SeNB switch message from the MeNB 303, the controller 1403 performs bearer switching for a new SeNB (i.e., the SeNB 2 307). The controller 1403 performs a procedure for reporting a CQI, maintains synchronization with the SeNB 2 307, generates the CQI report, and transmits the CQI report to the SeNB 2 307 through the transceiver 1401. The controller 1403 also receives a data packet through the transceiver 1401 based on the scheduling information received from the SeNB 2 307.

In another example, in the second embodiment of FIG. 4, the controller 1403 performs measurement with respect to nearby eNBs, determines whether the SeNB switch criteria are satisfied based on the measurement, and determines to transmit the SeNB switch message to the SeNB 2 307 if the criteria are satisfied.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random-access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine(computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

The invention claimed is:

1. A method, by a master evolved NodeB (MeNB), for switching a secondary eNB (SeNB) communicating with a user equipment (UE) in a wireless communication system supporting the MeNB and at least two SeNB, the method comprising:
   receiving, from the UE, a measurement report (MR) of the at least two SeNB neighboring with the UE;
   determining whether predetermined switch criteria are satisfied based on the MR; and
   transmitting, to the UE and a first SeNB or a second SeNB, a switch message indicating switching of a SeNB cooperating with the MeNB for communication with the UE from the first SeNB to the second SeNB, based on whether the predetermined switch criteria are satisfied.

2. The method of claim 1, further comprising:
   receiving, from the first SeNB, sequence number (SN) information of a packet transmitted last to the UE by the first SeNB;
   transmitting, to the second SeNB, the SN information; and
   transmitting, to the second SeNB, a next packet following the packet corresponding to the SN information.

3. The method of claim 1, further comprising:
   multicasting, by the MeNB, packets to be transmitted to the UE to the first SeNB and the second SeNB before receiving the MR.

4. The method of claim 1, wherein the predetermined switch criteria comprise at least one of a channel condition of the first SeNB being less than or equal to a first threshold value, a channel condition of the second SeNB being greater than or equal to a second threshold value, or reception of a radio link failure (RLF) report for the first SeNB from the UE.

5. A method, by a user equipment (UE), for switching a secondary evolved NodeB (SeNB) communicating with the UE in a wireless communication system supporting a master eNB (MeNB) and a plurality of SeNBs, the method comprising:
   communicating with the MeNB and a first SeNB among the plurality of SeNBs;
   performing measurement with respect to the plurality of SeNBs including the first SeNB and a second SeNB;
   determining whether predetermined switch criteria are satisfied based on a measurement result; and
   transmitting, to the MeNB, a switch message indicating switching of a SeNB cooperating with the MeNB for communication with the UE from the first SeNB to the second SeNB, in response to determining that the predetermined switch criteria are satisfied.

6. The method of claim 5, further comprising:
   performing bearer switching for the second SeNB;
   measuring a channel condition of the second SeNB and transmitting a measured channel condition to the second SeNB;
   receiving scheduling information from the second SeNB; and
   receiving a data packet from the second SeNB based on the switched bearer and the received scheduling information.

7. The method of claim 5, further comprising:
   receiving, from the MeNB, a resource allocation message for transmission of the switch message, the first SeNB being in communication with the UE, and the second SeNB not being in communication with the UE.

8. The method of claim 5, wherein the predetermined switch criteria comprise at least one of a channel condition of the first SeNB being less than or equal to a first threshold value, a channel condition of the second SeNB being greater than or equal to a second threshold value, or UE's radio link failure (RLF) for the first SeNB.

9. A method, by a master evolved NodeB (MeNB), for switching a secondary eNB (SeNB) communicating with a user equipment (UE) in a wireless communication system supporting the MeNB and at least two SeNB, the method comprising:
   receiving, from the UE, a switch message indicating switching of a SeNB for communication with the UE from a first SeNB to a second SeNB;
   transmitting the switch message to the first SeNB;
   receiving, from the first SeNB, sequence number (SN) information of a packet transmitted last to the UE by the first SeNB;

transmitting, to the second SeNB, the SN information; and transmitting, to the second SeNB, a next packet following the packet corresponding to the SN information.

10. The method of claim 9, further comprising:
allocating a resource for transmission of the switch message to the UE.

11. A master evolved NodeB (MeNB) for switching secondary evolved NodeB (SeNB) communicating with a user equipment (UE) in a wireless communication system supporting the MeNB and at least two SeNB, the MeNB comprising:
a transceiver; and
a processor configured to:
control the transceiver to receive, from the UE, a measurement report (MR) of the at least two SeNB neighboring with the UE,
determine whether predetermined switch criteria are satisfied based on the MR, and
control the transceiver to transmit, to the UE and a first SeNB or a second SeNB, a switch message indicating switching of a SeNB cooperating with the MeNB for communication with the UE from the first SeNB to the second SeNB, based on whether the predetermined switch criteria are satisfied.

12. The MeNB of claim 11, wherein the processor is further configured to:
control the transceiver to receive, from the first SeNB, sequence number (SN) information of a packet transmitted last to the UE by the first SeNB;
control the transceiver to transmit, to the second SeNB, the SN information to the second SeNB; and
control the transceiver to transmit, to the second SeNB, a next packet following the packet corresponding to the SN information to the second SeNB.

13. The MeNB of claim 11, wherein the processor is further configured to:
multicast packets to be transmitted to the UE to the first SeNB and the second SeNB before receiving the MR.

14. The MeNB of claim 11, wherein the predetermined switch criteria comprise at least one of a channel condition of the first SeNB being less than or equal to a first threshold value, a channel condition of the second SeNB being greater than or equal to a second threshold value, or reception of a radio link failure (RLF) report for the first SeNB from the UE.

15. A user equipment (UE) for switching secondary evolved NodeB (SeNB) communicating with the UE in a wireless communication system supporting a master eNB (MeNB) and a plurality of SeNBs, the UE comprising:
a transceiver; and
a processor coupled with the transceiver and configured to:
communicate with the MeNB and a first SeNB among the plurality of SeNBs,
perform measurement with respect to the plurality of SeNBs including the first SeNB and a second SeNB,
determine whether predetermined SeNB switch criteria are satisfied based on a measurement; result, and
control the transceiver to transmit, to the MeNB a switch message indicating switching of a SeNB cooperating with the MeNB for communication with the UE from the first SeNB in response to determine that the predetermined SeNB switch criteria are satisfied.

16. The UE of claim 15, wherein the processor is further configured to:
perform bearer switching for the second SeNB;
measure a channel condition of the second SeNB and transmitting a measured channel condition to the second SeNB;
control the transceiver to receive scheduling information from the second SeNB; and
control the transceiver to receive a data packet from the second SeNB based on the switched bearer and the received scheduling information.

17. The UE of claim 15, wherein the processor is further configured to:
control the transceiver to receive, from the MeNB, a resource allocation message for transmission of the switch message, the first SeNB being in communication with the UE, and the second SeNB not being in communication with the UE.

18. The UE of claim 15, wherein the predetermined SeNB switch criteria comprise at least one of a channel condition of the first SeNB being less than or equal to a first threshold value, a channel condition of the second SeNB being greater than or equal to a second threshold value, or UE's radio link failure (RLF) for the first SeNB.

19. A master evolved NodeB (MeNB) for switching secondary eNB (SeNB) communicating with a user equipment (UE) in a wireless communication system supporting the MeNB and at least two SeNBs, the MeNB comprising:
a transceiver; and
a processor configured to control the transceiver to:
receive, from the UE, a SeNB switch message indicating switching of an SeNB for communication with the UE from a first SeNB to a second SeNB,
transmit the SeNB switch message to the first SeNB,
receive, from the first SeNB, sequence number (SN) information of a packet transmitted last to the UE by the first SeNB,
transmit, to the second SeNB, the SN information to the second SeNB, and transmit, to the second SeNB, a next packet following the packet corresponding to the SN information to the second SeNB.

20. The MeNB of claim 19, wherein the processor is further configured to:
allocate a resource for transmission of the SeNB switch message to the UE.

* * * * *